US008510832B2

(12) United States Patent
Liu et al.

(10) Patent No.: US 8,510,832 B2
(45) **Date of Patent: *Aug. 13, 2013**

(54) METHOD AND SYSTEM FOR CONTENT CATEGORIZATION

(71) Applicant: Huawei Technologies Co., Ltd., Shenzhen (CN)

(72) Inventors: Yiling Liu, Shenzhen (CN); Xiaoqian Chai, Shenzhen (CN); Jin Peng, Shenzhen (CN); Johan Zuidweg, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,564

(22) Filed: Sep. 28, 2012

(65) Prior Publication Data

US 2013/0031102 A1 Jan. 31, 2013

Related U.S. Application Data

(63) Continuation of application No. 12/466,529, filed on May 15, 2009, now Pat. No. 8,286,240, which is a continuation of application No. PCT/CN2008/070001, filed on Jan. 2, 2008.

(30) Foreign Application Priority Data

Apr. 23, 2007 (CN) .......................... 2007 1 0097952

(51) Int. Cl.
*G06F 21/00* (2013.01)

(52) U.S. Cl.
USPC ............................................. 726/22; 707/731

(58) Field of Classification Search
USPC ............................................ 726/22; 707/731
See application file for complete search history.

(56) References Cited

U.S. PATENT DOCUMENTS 7,711,652 B2 * 5/2010 Schmelzer ...................... 705/67
8,286,240 B2 * 10/2012 Liu et al. ......................... 726/22

(Continued)

FOREIGN PATENT DOCUMENTS

CN 1494013 5/2004
CN 1619531 5/2005

(Continued)

OTHER PUBLICATIONS

"Categorization Based Content Screening Framework Requirements" Candidate Version 1.0. Open Mobile Alliance. Jul. 11, 2006:1-31.

(Continued)

*Primary Examiner* — Matthew Smithers
(74) *Attorney, Agent, or Firm* — Brinks Hofer Gilson & Lione

(57) ABSTRACT

The invention discloses a method and system for content categorization, which aims at reducing the processing burthen of the content categorization as well as the network transmission traffic. The method comprises: transmitting, by a content categorization requester, a content digest of a content to be categorized to a content categorization provider; and performing, by the content categorization provider, content categorization according to the content digest. The device for requesting content categorization comprises: a digest operation determination component, adapted to determine whether it is necessary to obtain a content digest of a content to be categorized; a digest obtaining component, adapted to obtain the content digest of the content to be categorized when the digest operation determination component determines it necessary to obtain the content digest of the content to be categorized; and a first transmit component, adapted to transmit the content digest obtained by the digest obtaining component.

8 Claims, 6 Drawing Sheets

(56) References Cited

U.S. PATENT DOCUMENTS

| | | | |
|---|---|---|---|
| 2004/0093561 | A1 | 5/2004 | Yeh et al. |
| 2007/0150948 | A1 | 6/2007 | De Spiegeleer |
| 2009/0240684 | A1 | 9/2009 | Newell et al. |

FOREIGN PATENT DOCUMENTS

| | | |
|---|---|---|
| CN | 1758245 | 4/2006 |
| CN | 10100603 | 7/2007 |
| CN | 101000603 A | 7/2007 |

OTHER PUBLICATIONS

"Categorization Based Content Screening Framework Architecture" Draft Version 1.0. Open Mobile Alliance. Apr. 19, 2007:1-18.

"Categorization Based Content Screening 1.0" Draft Version 1.0. Open Mobile Alliance. Dec. 13, 2007:1-26.

Katell, Henry "Content Signature Definition Change Request" Open Mobile Alliance. Mar. 26, 2007:1-2.

Ince, Darrel "File Signature Definition" A Definition of the Internet. Dec. 31, 2001.

Supplementary European Search Report issued in corresponding European Patent Application No. 08 70 0028; mailed May 26, 2010.

English Translation of Written Opinion of the International Searching Authority issued in corresponding PCT Patent Application No. PCT/CN2008/070001, mailed Apr. 17, 2008.

Office Action and Partial Translation of Office Action issued in corresponding Chinese Patent Application No. CN200710097952.X, mailed Aug. 14, 2009.

Office Action issued in corresponding European Patent Application No. 08700028.7, mailed Jul. 13, 2012.

Summons to Attend Oral Proceedings issued in corresponding European Patent Application No. 08700028.7, mailed Apr. 25, 2013.

Office Action issued in corresponding U.S. Appl. No. 12/466,529, mailed Nov. 2, 2011.

Office Action issued in corresponding U.S. Appl. No. 12/466,529, mailed Mar. 20, 2012.

Open Mobile Alliance, Categorization Based Content Screening Framework Architecture Draft 1.0.1, Mar. 16, 2007, with edits.

* cited by examiner

METHOD AND SYSTEM FOR CONTENT CATEGORIZATION

CROSS-REFERENCE TO RELATED APPLICATIONS

This application is a continuation of U.S. patent application Ser. No. 12/466,529, filed on May 15, 2009, which is a continuation of International Application No. PCT/CN2008/070001, filed on Jan. 2, 2008. The International Application claims priority to Chinese Patent Application No. 200710097952.X, filed on Apr. 23, 2007. The aforementioned patent applications are hereby incorporated by reference in their entireties.

FIELD OF THE INVENTION

The present invention relates to the field of network and communication, and more particularly, to a method and system for content categorization.

BACKGROUND

With the rapid development of the network technology and the various information technologies, the contents that the user may access gradually get out of the constraint of time and space. As a result, the possibility of the user being exposed to contents that are unhealthy and threatening to the client, such as pornography, violence and virus, are significantly increased, which leads to an ever stronger requirement for screening of the communication contents. The existing screening technologies include list screening, keyword screening, template screening and categorization screening etc, among which the categorization-based content screening is a much interested research topic due to its flexibility and wide application. On the other hand, with 50 years of development of the automatic digest technology, the related fundamental technologies (such as automatic word segmentation) also went through a long-term development and formed some application systems. Automatic digest of western language is particularly well developed. Also the research on video digest technology has rendered much result and is getting more well-established.

Please refer to FIG. 1, the current Categorization-Based Content Screening (CBCS) architecture is principally divided into two parts, that is, a content screening component and a content categorization component. The content categorization component is adapted to provide an interface CBCS-1, whereby a content categorization requester (including the content screening component internal to the architecture and other external requesters) may obtain content category of the contents to be categorized. The parameters that can be input by the content categorization requester include the content itself or content references, such as Uniform Resource Identifiers (URIs) and/or other content-related information (such as content provider).

Please refer to FIG. 2, which shows a process for the content categorization requester to obtain the content categories of the content to be categorized according to the prior art. The process includes the following steps:

Step 1: The content categorization requester determines to request the content categories by means of the content itself. For example, in case one, the content categorization requester is the content screening component, and a content screening request received by the content screening component only contains the content itself without other content reference or pre-categorized information. In case two, the content categorization requester is the content screening component, and the content of a content screening request received by the content screening component is the pre-categorized content, but the pre-categorization information is unreliable and there is no other content reference. In case three, the content categorization requester is the content screening component, and a content screening request received by the content screening component contains the content itself and its content reference, but the content categorization provider (content categorization component) can not provide category information corresponding to the content reference. In case four the content provider as the content categorization requester only intends to request the category information in order to generate pre-categorized content. Thus the content provided by the content provider contains its category which can be used directly. In case five, the content categorization requester is the content screening component, and a content screening request received by the content screening component contains the content itself and its content reference. However, the content itself is directly used to request the content category since the content screening component is configured into a mode that doesn't support the obtaining of category based on the content reference.

Step 2: The content categorization requester formulates a content categorization request message which carries the content itself, and transmits the message to the content categorization provider.

Step 3: The content categorization provider extracts the content itself from the content categorization request message and applies an appropriate algorithm to the content itself to perform categorization.

Step 4: The content categorization provider formulates a response message and returns the content category to the content categorization requester.

Among the input parameters, only the content itself and the URI corresponding to the content can reflect the content directly. The URI can not always be available. Meanwhile, the content categorization provider may not always be able to provide the content category corresponding to the URI (because, for example, the corresponding content categories may not be stored within the content categorization component or can not be obtained by the content categorization component externally). In this case, the content categorization requester can provide only the content itself to the content categorization provider. While the content is probably very large and needs to be carried in a plurality of data packets partitioned from a content categorization request message. In this case, not only the content categorization provider is required to parse the content to be categorized from the request message, but also lots of buffering and content rearranging is required. Finally, the categorization may be performed according to the categorization algorithm.

During the research, the inventor has the following finding: in the prior art, in the information provided by the content categorization requester to the content categorization provider when requesting the content category, only two input parameters, the content itself and the URI are shown directly. There is a lack of an efficient processing method while providing the content itself to the content categorization provider. This not only makes the processing burden of the content categorization provider heavier, but also increases the network transmission traffic, especially when an external entity requests the content category through the interface CBCS.

SUMMARY

An embodiment of the invention provides a method for requesting content categorization to reduce the network transmission traffic.

An embodiment of the invention provides a method for categorizing a content to reduce the processing burthen of the content categorization.

An embodiment of the invention provides a method and system for content categorization to reduce the processing burthen of the content categorization as well as the network transmission traffic.

A method for requesting content categorization according to the embodiment of the invention includes the following steps:

obtaining a content digest of a content to be categorized, generating a content categorization request message and carrying the content digest in the content categorization request message; and transmitting the content categorization request message carrying the content digest for requesting the content category.

A method for categorizing a content according to the embodiment of the invention includes the following steps:

receiving a content categorization request message, which carries a content digest of a content to be categorized; and performing content categorization on the content to be categorized according to the content digest.

A method for content categorization according to the embodiment of the invention includes: transmitting a content digest of a content to be categorized to a content categorization provider by a content categorization requester; and performing content categorization according to the content digest by the content categorization provider.

A system for requesting content categorization according to the embodiment of the invention includes: a digest operation determination component, adapted to determine whether it is necessary to obtain a content digest of a content to be categorized; a digest obtaining component, adapted to obtain the content digest of the content to be categorized when the digest operation determination component determines it necessary to obtain the content digest of the content to be categorized; and a first transmit component, adapted to transmit the content digest obtained by the digest obtaining component.

An embodiment of the invention further provides a device for providing content categorization, which includes:

a receiving component, adapted to receive a content categorization request message, which carries a content digest of a content to be categorized; and a content categorization component, adapted to perform content categorization on the content to be categorized according to the content digest.

An embodiment of the invention provides a system for content categorization, which includes a content categorization requester side and a content categorization provider side; wherein the content categorization requester side includes:

a content categorization requesting device, which further includes: a digest operation determination component, adapted to determine whether it is necessary to obtain a content digest of a content to be categorized; a digest obtaining component, adapted to obtain the content digest of the content to be categorized when the digest operation determination component determines it necessary to obtain the content digest of the content to be categorized; a first transmit component, adapted to transmit the content digest obtained by the digest obtaining component;

the content categorization provider side includes a content categorization providing device, adapted to perform content categorization according to the content digest transmitted from the content categorization requesting device.

In the embodiment of the invention, the content categorization requester transmits the content digest of the content to be categorized to the content categorization provider; the content categorization provider performs content categorization according to the content digest.

The embodiments of the invention have the following advantages:

The embodiments of the invention request the content category from the content categorization provider by means of the content digest of the content to be categorized, which is much smaller than the content itself. As a result, the processing burthen of the content categorization and the network transmission traffic are reduced.

DETAILED DESCRIPTION

In order to reduce the network transmission traffic, an embodiment of the invention provides a method for requesting content categorization, which includes the following steps: A content categorization requester obtains a content digest of a content to be categorized; the content categorization requester generates a content categorization request message, wherein the content digest is carried in the content categorization request message; and categorization requester transmits the content categorization request message carrying the content digest to request the content category.

When the content categorization requester determines it is necessary to request the content category by means of the content to be categorized, the content categorization requester further determines whether it is necessary to obtain the content digest of the content to be categorized, and the content categorization requester obtains the content digest when it determines necessary to obtain the content digest of the content to be categorized.

In order to reduce the processing burden of the content categorization, an embodiment of the invention provides a method for categorizing a content, which includes the following steps: receiving a content categorization request message by a content categorization provider, wherein the content categorization request message carries a content digest of a content to be categorized; performing content categorization on the content to be categorized according to the content digest by the content categorization provider.

Figure 1:
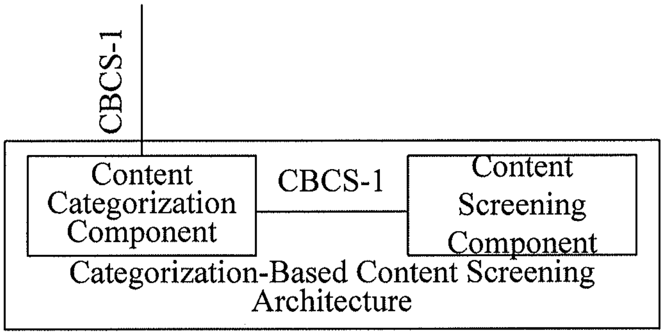
FIG. 1 illustrates a schematic drawing of the current Categorization-Based Content screening.
Figure 2:
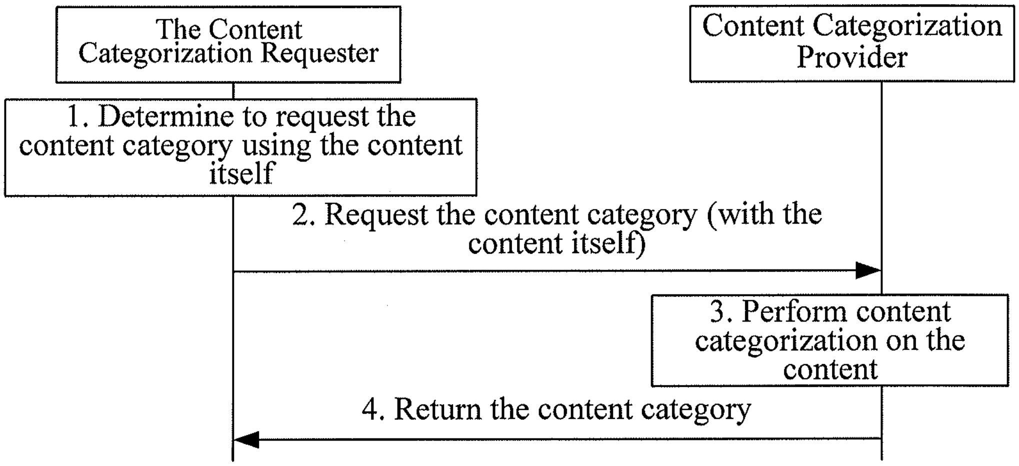
FIG. 2 illustrates a flow chart of a content categorization requester obtaining content categories of the content to be categorized according to the prior art.
Figure 3:
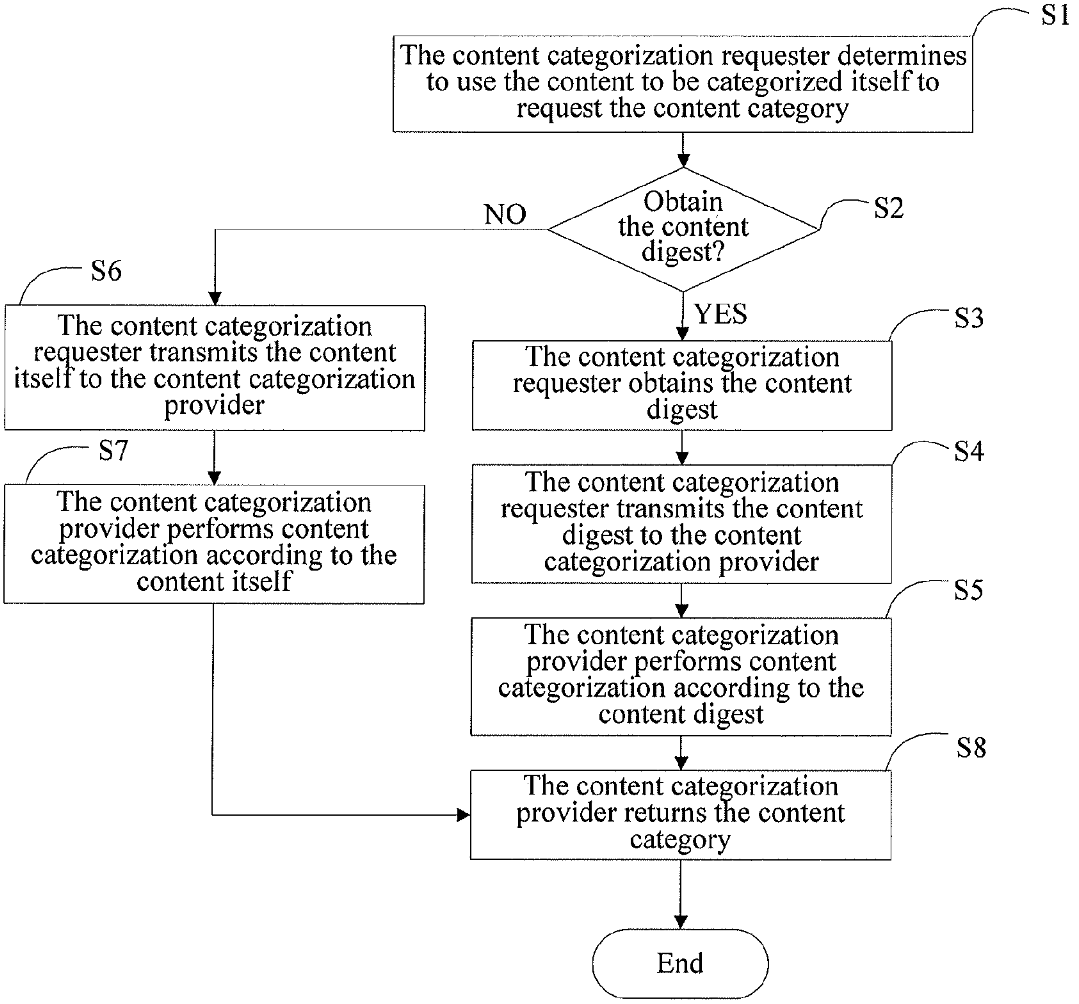
FIG. 3 illustrates a flow chart of a content categorization method according to an embodiment of the invention.

In order to reduce both the processing burden of the content categorization and the network transmission traffic, an embodiment of the invention provides a method for content categorization as shown in FIG. 3, which includes the following steps:

S1: The content categorization requester determines to request the content category according to the content to be categorized (optional).

S2: The content categorization requester determines whether it is necessary to obtain the content digest of the content to be categorized.

The content categorization requester may determine whether the data size of the content to be categorized is larger than a threshold, and/or whether the data format of the content to be categorized is one of predefined data formats, and/or whether it is specified by a user. The threshold, predefined data formats and specified by the user are the criterion for determining whether to obtain the content digest and carry the content digest in the subsequent content categorization request message. Different thresholds may be defined for different data formats (data formats means text, image, audio, video, multimedia and even a specific format such as video in rm, avi, mpeg formats); and a common threshold may be used as well.

If the determination result is positive, then proceeds to step S3; otherwise, proceeds to step S6.

S3: The content categorization requester obtains the content digest of the content to be categorized.

The content digest accurately and fully reflects primary information of the content to be categorized and has a data size much smaller than that of the content to be categorized. The step of obtaining the content digest of the content to be categorized may involve obtaining the content digest of the content to be categorized from other entities. For example, the content categorization requester transmits the content to be categorized to a stand-alone digest processing server, which performs the digest operation determination and generates the content digest of the content to be categorized that meets the digest obtaining condition then transmits the content digest back to the content categorization requester. Furthermore, the content categorization requester may generate the content digest of the content to be categorized. The process of generating the content digest of the content to be categorized may be the following: for example, the digest of text may be an output of the existing automatic digesting technology; the digest of a picture may be a picture rendering the same scene while having a transformed format and a overall scaled-down size (e.g., a BMP image of 1024*768 and 2.4M may be transformed into a GIF image of 133*100 and 13K); and the digest of a video may be an output of the existing video digesting technology.

S4: The content categorization requester formulates the content categorization request message and transmits the content categorization request message to the content categorization provider. The content categorization request message carries the content digest obtained in the previous step.

In another embodiment, the content categorization requester may instruct the content categorization provider to perform content categorization on the content digest by means of an algorithm corresponding to the content digest. Specifically, the instruction may be done by carrying type information in the content categorization request message, or by further carrying digest-related information (such as a digest obtaining component reference, data size, obtaining time, digest generating algorithm used etc), and content-related information, such as an reference of the content provider (which refers to an external content screening component), data size and creating time, in order to inform the content categorization provider that the content carried in the message is the content digest.

S5: The content categorization provider extracts the content digest from the content categorization request message and categorizes the content digest. Then go to step S8.

In the other embodiment described above, when the content categorization request message transmitted by the content categorization requester carries the type information, the content categorization provider determines, according to the type information, that what is transmitted by the content categorization requester is the content digest, the content categorization provider performs content categorization on the content digest by means of the algorithm corresponding to the content digest.

S6: The content categorization requester formulates a content categorization request message by means of the content to be categorized and provides the content categorization request message to the content categorization provider. The content categorization request message carries the content itself of the content to be categorized.

In practical applications, the content categorization requester may also instruct the content categorization provider to perform content categorization on the content by means of an algorithm corresponding to the content. Specifically, type information may be carried in the content categorization request message to inform the content categorization provider that the content is carried in the message.

S7: The content categorization provider extracts the content from the content categorization request message and categorizes the content.

When the content categorization request message transmitted by the content categorization requester carries the type information, the content categorization provider determines, according to the type information, that what is transmitted by the content categorization requester is the content, the content categorization provider performs content categorization on the content by means of the algorithm corresponding to the content.

S8: The content categorization provider formulates a response message and transmits the content category to the content categorization requester.

It should be noted that in the prior art, when the content categorization requester is the CBCS content screening component, the received content may be buffered first during the practical processing. Upon the receiving is finished, the received content will be transmitted in packets in the format of content categorization request through the interface CBCS-1. The received content may also be transmitted in packets while being received and buffered. In the embodiment of the invention, when it is necessary to generate the content digest, it needs to receive and buffer all the content first and then generate the content digest according to the buffered content.

Figure 4:
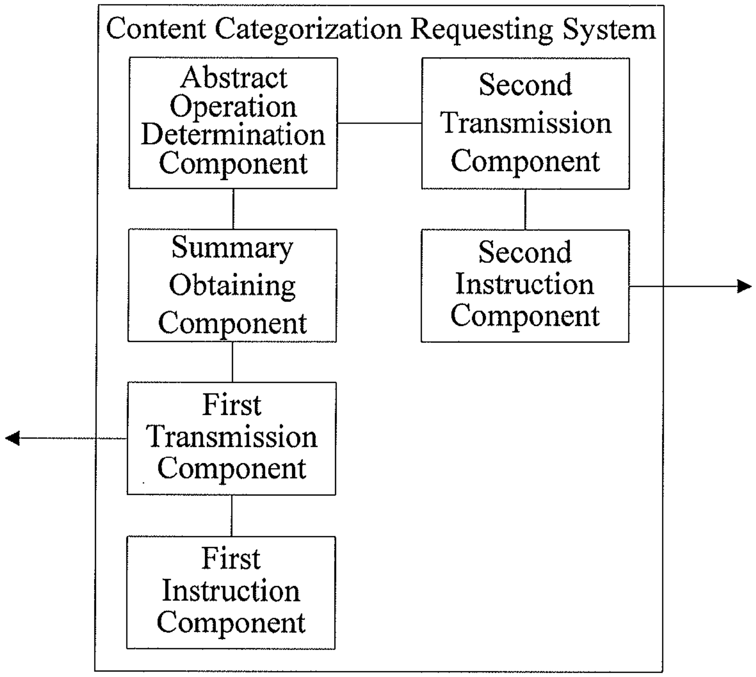
FIG. 4 illustrates a schematic drawing of a system for requesting content categorization according to an embodiment of the invention.

An embodiment of the invention also provides a system for requesting content categorization. Please refer to FIG. 4, which illustrates a schematic drawing of the system for requesting content categorization according to the embodiment of the invention.

The system for requesting content categorization includes: a digest operation determination component, a digest obtaining component and a first transmit component; the system further includes a second transmit component, a first instructing component and a second instructing component.

The digest operation determination component is adapted to determine whether it is necessary to obtain the content digest of the content to be categorized.

The digest obtaining component is adapted to obtain the content digest of the content to be categorized when the digest operation determination component determines it is necessary to obtain the content digest of the content to be categorized.

The first transmit component is adapted to transmit the content digest obtained by the digest obtaining component.

The first instructing component is adapted to instruct, through the first transmit component, a content categorization provider to perform content categorization on the content digest by means of an algorithm corresponding to the content digest.

The second transmit component is adapted to transmit the content to be categorized when the digest operation determination component determines it is unnecessary to obtain the content digest of the content to be categorized.

The second instructing component is adapted to instruct, through the second transmit component, the content categorization provider to perform content categorization on the content by means of an algorithm corresponding to the content.

An embodiment of the invention also provides a system for content categorization, which includes: a content categorization requester side and a content categorization provider side.

The content categorization requester side further includes: a content categorization requesting device (that is, the content categorization requesting device according to the embodiment of the invention) and a content providing device.

The content providing device further includes: a content providing component, adapted to provide the content to be categorized; a determination component, adapted to determine whether it is necessary for the content providing component to provide the content to be categorized, and to trigger the content categorization requesting device when it determines necessary to provide the content to be categorized; a third transmit component, adapted to transmit the content to be categorized to the content categorization providing device, when learning that the digest operation determination component determines it is unnecessary to obtain the content digest of the content to be categorized; a third instructing component, adapted to instruct, through the third transmit component, the content categorization providing device to perform content categorization on the content by means of an algorithm corresponding to the content.

The content categorization requesting device further includes: a digest operation determination component, adapted to determine whether it is necessary to obtain the content digest of the content to be categorized; a digest obtaining component adapted to obtain the content digest of the content to be categorized when the digest operation determination component determines it is necessary to obtain the content digest of the content to be categorized; a first transmit component, adapted to transmit the content digest obtained by the digest obtaining component; a first instructing component, adapted to instruct, through the first transmit component, the content categorization providing device to perform content categorization on the content digest by means of an algorithm corresponding to the content digest; a second transmit component which doesn't coexist with the third transmit component in the content providing device, adapted to transmit the content to be categorized to the content categorization providing device, when the digest operation determination component determines it is unnecessary to obtain the content digest of the content to be categorized; a second instructing component which doesn't coexist with the third instructing component in the content providing device, adapted to instruct, through the second transmit component, the content categorization providing device to perform content categorization on the content by means of an algorithm corresponding to the content.

The content categorization provider side includes a content categorization providing device, adapted to perform content categorization according to the content digest transmitted from the content categorization requesting device.

The above description will be described in detail through the following embodiments.

Embodiment One

The Content to be Screened is Categorized and Screened

Figure 5:
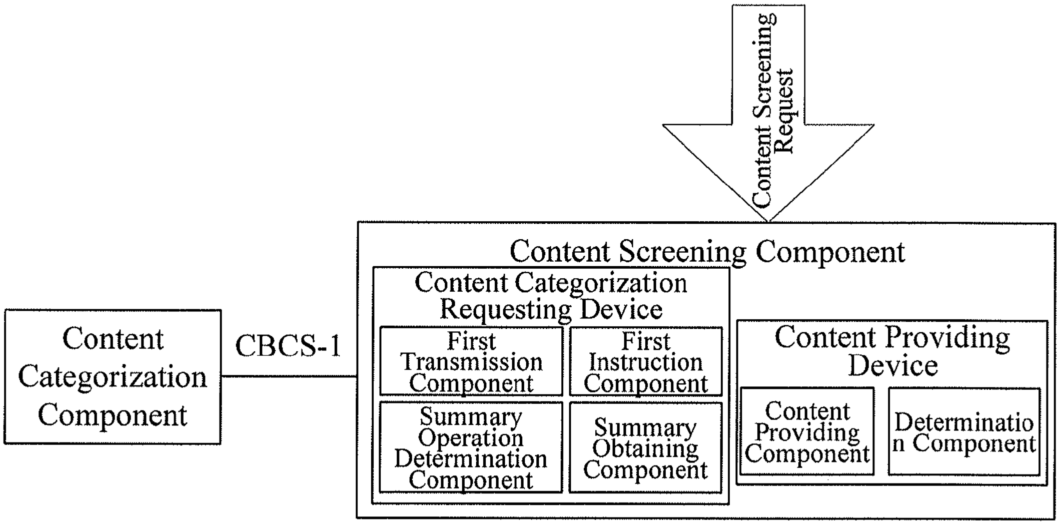
FIG. 5 illustrates a schematic drawing of a first embodiment of a content categorization system according to an embodiment of the invention.

Please refer to FIG. 5, which illustrates a schematic drawing of a first embodiment of the content categorization system according to the invention.

The content categorization system is composed of a content categorization component (i.e., the content categorization providing device) and a content screening component (within which contains the content providing device and the content categorization requesting device).

The detailed processing flow of the embodiment is as follows: the content screening component receives a content screening request from an external content screening requester and the content of the content screening request is photo.jpg. Because the content screening component determines through the determination component that the content screening request only carries the content without any type information, then the content screening component determines it is necessary to request the content category by means of the content. The content screening component provides the content to the digest operation determination component through the content providing component therein. The digest generation threshold of picture content predefined by the digest operation determination component is 500 KB, while the size of photo.jpg detected by the content screening component through the digest operation determination component therein is 2.71 MB, which is larger than the threshold. Thus, the digest obtaining component in the content screening component generates a digest photo1.jpg with a size of 26 KB, using an algorithm which directly scales down the whole picture to 10% of the original size, according to the type and size of the content. The content screening component use the first transmit component therein to encapsulate photo1.jpg in the content categorization request message, and transmits the message to the content categorization component through the interface CBCS-1. A type information can also be carried in this message through the first instructing component to inform the content categorization component that what is carried in the message is the digest and the digest-related information (such as a digest obtaining component reference, data size, generation time, digest generation algorithm that is used) and content-related information, such as the reference of the content provider (here it is the external content screening component), data size, creating time etc.

Specifically, carrying the type information is a function of the implementation of the interface CBCS-1. For example, it may be carried as a parameter:

```
 <?xml version="1.0" encoding="UTF-8"?>
<Message xmlns="cbcs.dtd">
 <Content>
  <Type>Abstract</Type> <!-indicating content type, which may be:
  URI, Abstract, Original-->
  <Value>AXKjDF......</Value>
 </Content>
</Message>
```

Another example might be directly reflecting the interface in the content format:

```
<?xml version="1.0" encoding="UTF-8"?>
<Message xmlns="cbcs.dtd">
 <Content>
  <URI/>
 <Abstract> AXKjDF......</Abstract>
 <Original/>
<Content>
</Message>
```

The content categorization component, according to the type information informed, performs categorization processing on photo1.jpg, by means of a picture categorization algorithm applied for a picture whose data format is JPG and whose type is content digest, and then transmits the obtained content category back to the content screening component.

When implementing the embodiment, there might be various scenarios, for example, 1) the content categorization component and the content screening component are provided as the same server; 2) the content screening component is provided as a separate server A, and the content categorization component and other content screening components are provided as server B, the server A obtains the content category from the content categorization component of the server B through the interface CBCS-1; 3) a separate content screening component is provided as server C, and a separate content categorization component is provided as server D. Depending on the practical situations, a single C corresponds to several Ds, or a single D corresponds to several Cs, or several Cs correspond to several Ds.

Embodiments Two

The Content to be Screened is Categorized and Screened

Figure 6:
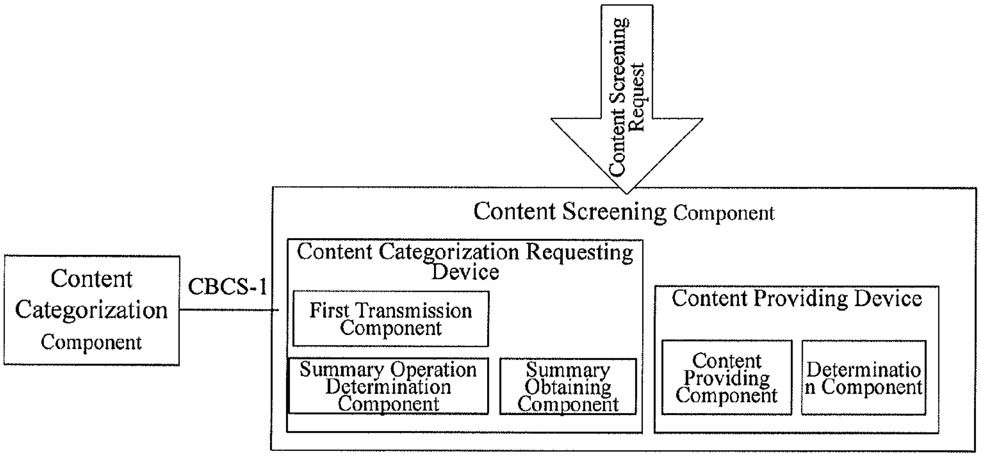
FIG. 6 illustrates a schematic drawing of a second embodiment of a content categorization system according to an embodiment of the invention.

Please refer to FIG. 6, which illustrates a schematic drawing of the composition of a second embodiment of the content categorization system according to the invention.

The content categorization system is composed of a content categorization component (that is, the content categorization providing device) and a content screening component (which includes the content providing device and the content categorization requesting device).

The detailed processing flow of the embodiment is as follows: the content screening component receives a content screening request from an external content screening requester and the content of the content screening request is novel.txt. The content screening component determines through the determination component that the content screening request carries a pre-categorization information then performs reliability verification on the pre-categorization information. It turns out that the pre-categorization information is not reliability, thus determining it is necessary to use the content to request the content category. The content screening component provides the content to the digest operation determination component through the content providing component therein. The digest generation threshold of the text content predefined by the digest operation determination component is 500 KB, while the content screening component finds through the digest operation determination component that the size of novel.txt is 783 KB, which is larger than the threshold. Thus, the digest obtaining component in the content screening component uses the automatic digesting technology to generate a digest with a size of 6 KB. The content screening component encapsulates the 6 KB digest in the content categorization request message through the first transmit component therein and transmits the message to the content categorization component through the interface CBCS-1. The content categorization component uses an appropriate algorithm to perform categorization processing on the digest, and then transmits the obtained content category to the content screening component.

When deploying the embodiment, there might be various scenarios. For example, in case one, the content categorization component and the content screening component are provided as the same server. In case two, the content screening component is provided as a separate server A, and the content categorization component and other content screening components are provided as server B, the server A obtains the content category from the content categorization component of the server B through the interface CBCS-1. In case three, a separate content screening component is provided as server C, and a separate content categorization component is provided as server D. Depending on the practical situations, a single C corresponds to several Ds, or a single D corresponds to several Cs, or several Cs correspond to several Ds.

Embodiment Three

The content providing component provides the content to the user. To quickly screen the provided content at the content screening component, the content providing component obtains the content category beforehand (not need to be in real time) and appends the content category to the content by means of metadata or watermark, thereby generates pre-categorized content to be downloaded by the user. Thus, when there is a strict requirement on real-time, the content screening component may perform fast screening according to the content category in the pre-categorized content.

Figure 7:
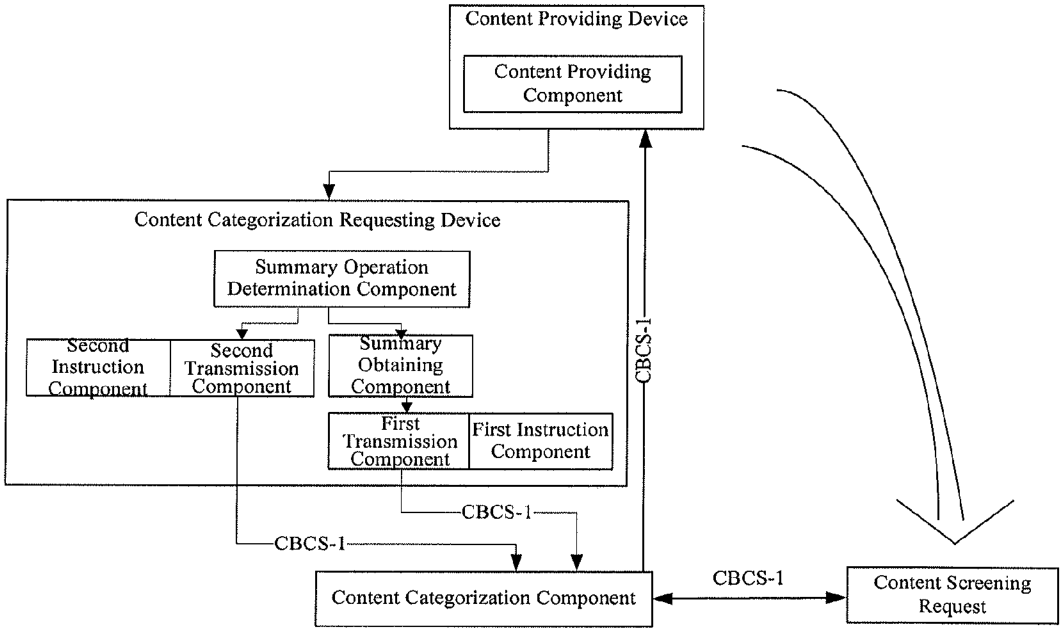
FIG. 7 illustrates a schematic drawing of a third embodiment of a content categorization system according to an embodiment of the invention.

Please refer to FIG. 7, which illustrates a schematic drawing of the composition of a third embodiment of the content categorization system according to the invention.

The content categorization system includes: a content categorization requesting device and a content providing device on the content categorization requester side; a content categorization component (a content categorization providing device) on the content categorization provider side; and a content screening component adapted to perform screening directly according to the content category of the pre-categorized content after the content categorization is done.

Figure 8:
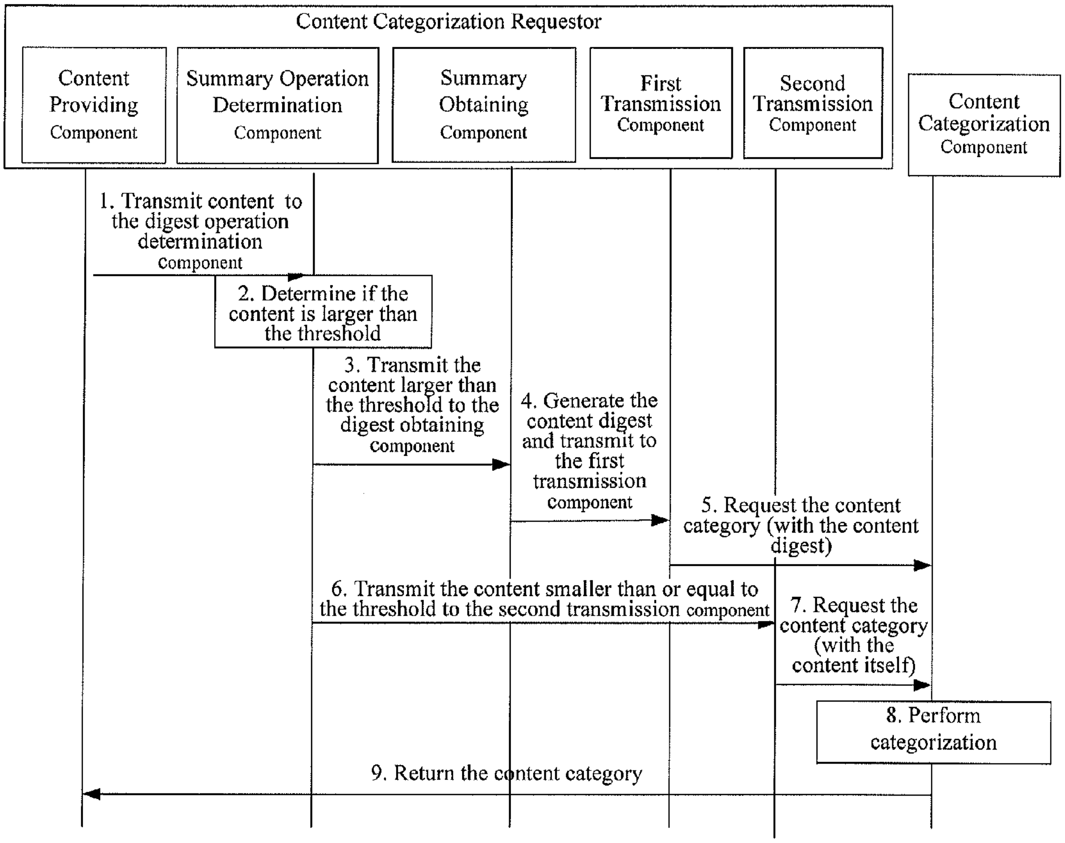
FIG. 8 illustrates a flow chart of a content categorization method based on the content categorization system shown in FIG. 7 according to an embodiment of the invention.

Please refer to FIG. 8, the detailed processing flow of the content categorization method based on the content categorization system shown in FIG. 7 according to an embodiment of the invention is as follows:

1: The content providing de vice needs to obtain the content category of the uncategorized content it provides to generate pre-categorized content. Thus, the content providing device provides the content (plus other information such as data size, data type, address of the content providing component) to the digest operation determination component in the content categorization requesting device, through the content providing component therein.

2: The digest operation determination component makes a determination according to the data size of the received content. If the size is larger than the predefined threshold, the flow proceeds to step 3; if the size is smaller than the predefined threshold, the flow proceeds to step 6.

3: The digest operation determination component transmits the content to the digest obtaining component.

4: The digest obtaining component generates the digest according to the received content and transmits the digest (which may carry the data size, data type and address of the content providing component) to the first transmit component.

5. The first transmit component encapsulates the digest into a content categorization request message. The first instructing component may also be used to carry a type information in the message, so that the content categorization component is informed of what is carried in the message is the digest. After that, the content categorization request message is transmitted to the content categorization component. The flow proceeds to step 8.

6: The digest operation determination component transmits the content itself to the second transmit component.

7. The second transmit component encapsulates the content itself into a content categorization request message. The second instructing component may also be used to carry the type information in the content categorization request message; so that the content categorization component is informed of what is carried in the content categorization request message is the content. After that, the content categorization request message is transmitted to the content categorization component.

8: The content categorization component extracts the digest or the content from the received content categorization request message, and performs the categorization processing according to the received type information.

9: The content categorization component returns the obtained content category to the content providing component in the content providing device.

In a specific implementation, for example, the content providing device needs to categorize a video having a duration of 26 minutes and 26 seconds. Thus the data size, data type of the video and the memory address where the content is stored are transmitted to the digest operation determination component which physically locates on the same entity. The digest operation determination component compares the data size with the thresholds corresponding to the data type (video). Since the data size is larger than the predefined video data threshold, the digest operation determination component reads out the content according to the received memory address and transmits information such as the content, the address of the content providing device, the data type, the data size etc. to the digest obtaining component which is provided by the operator and located in the same data center. The digest obtaining component selects an algorithm suitable for video and generates a digest with a duration of 6 minutes and 48 seconds (with a compression ratio of 3.89:1). The digest obtaining component transmits the digest and the address of the content providing device to the content categorization component for processing (the type information of the content submitted by an optional transmission is digest). The content categorization component performs categorization and then returns the content category to the content providing device.

In a practical deployment, the above components generally belong to two sides, one is the content provider providing the content and the other one is the operator or screening service provider. The operator provides the network access services such as Internet access, communication network access while operates their own content screening service. Furthermore, a content screening service can be provided to an operator by a separate screening service provider. To ensure the reliability of the digest, the digest obtaining component may locate only at the operator or the screening service provider.

The possible application modes are as follows. i) The content providing device belongs to the content provider while the rest of the components belong to the operator or the screening service provider. A digest server can be composed of a digest operation determination component and a digest obtaining component. The digest server can be located closely to the content provider so that broad bandwidth is possible. ii) Both the content providing device and the digest operation determination component belong to the content provider and the rest of the components belong to the operator or the screening service provider. The digest obtaining component locates closely to the content providing device so that broad bandwidth is possible. The digest operation determination component of the content provider stores the threshold agreed by the operator/screening service provider through negotiation (the operator/screening service provider may provide script file defining the threshold, which will be read and executed by the digest operation determination component). If there is a one to one correspondence between the content providing device and the digest server (the digest operation determination component and the digest obtaining component)/digest obtaining component, and the content categorization component stores the address of the content providing device corresponding to the digest server/digest obtaining component, it is unnecessary to carry the address of the content providing device in the content categorization request message. Otherwise, the address of the content providing device has to be carried in the content categorization request message.

Embodiment Four

The content providing component provides the content to the end user. To quickly screen the provided content at the content screening component, the content providing component obtains the content category beforehand (not need to be in real time) and appends the content category to the content by way of metadata or watermark, thereby generating pre-categorized content to be downloaded by the user. Thus, when there is a strict requirement on real-time, the content screening component may perform fast screening according to the content category in the pre-categorized content.

Figure 9:
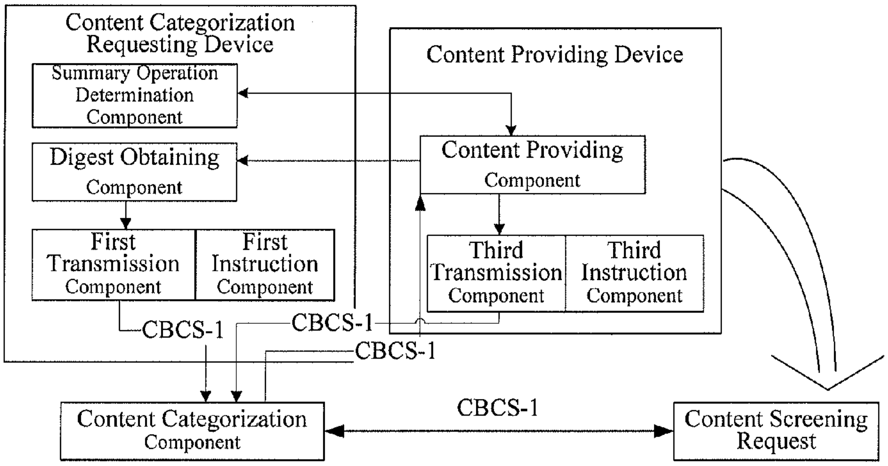
FIG. 9 illustrates a schematic drawing of a fourth embodiment of a content categorization system according to an embodiment of the invention.

Please refer to FIG. 9, which illustrates a schematic drawing of a fourth embodiment of the content categorization system according to the invention.

The content categorization system includes: a content categorization requesting device and a content providing device on a content categorization requester side; a content categorization component (a content categorization providing device) on a content categorization provider side; and a content screening component adapted to perform screening directly according to the content category of the pre-categorized content, after the content categorization is done.

Figure 10:
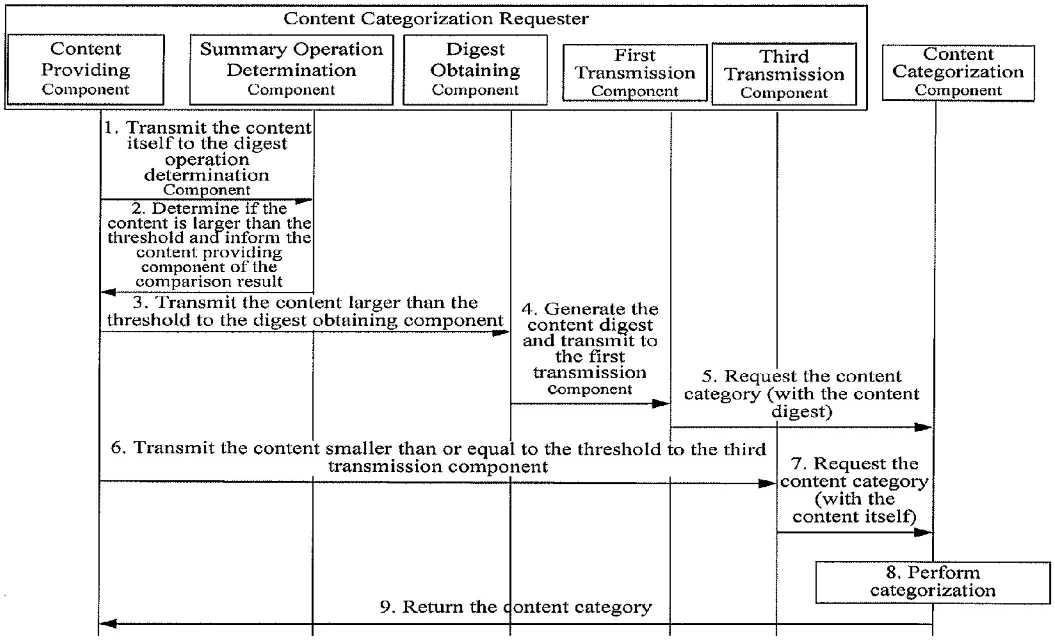
FIG. 10 illustrates a flow chart of a content categorization method based on the content categorization system shown in FIG. 9 according to an embodiment of the invention.

Please refer to FIG. 10, the detailed processing flow of the content categorization method based on the content categorization system shown in FIG. 9 according to the embodiment of the invention is as follows:

1: The content providing device needs to obtain the content category of the uncategorized content provided by itself to generate pre-categorized content. Thus, the content providing device provides, through the content providing component therein, the data size of the uncategorized content (which may also include other information such as data type, address of the content providing component) to the digest operation determination component in the content categorization requesting device.

2: The digest operation determination compares the data size of the uncategorized content with a predefined threshold and informs the content providing component of the comparison result. If the comparison result shows that the data size of the uncategorized content is larger than the predefined threshold, the flow proceeds to step 3; if the size is smaller than the predefined threshold, the flow proceeds to step 6.

3: The content providing component provides the uncategorized content to the digest obtaining component in the content categorization requesting device.

4: The digest obtaining component generates the digest according to the received content and transmits the digest (which may carry the data size, data type and address of the content providing component) to the first transmit component.

5: The first transmit component encapsulates the digest into a content categorization request message. The content categorization request message may also carry the type information by means of first instructing component, so that the content categorization component is informed of what is carried in the message is the digest, information related to the content digest and information related to the based-on content. Then the content categorization request message is transmitted to the content categorization component. The flow proceeds to step 8.

6: The content providing component transmits the uncategorized content to the third transmit component in the content providing device.

7: The third transmit component encapsulates the content into the content categorization request message. The content categorization request message may also carry the type information by means of first third instructing component, so that the content categorization component is informed of what is carried in the message is the content and the related information. After that, the content categorization request message is transmitted to the content categorization component.

8: The content categorization component extracts the digest or the content from the received content categorization request message and performs the categorization processing according to the received type information by means of the corresponding algorithm.

9: The content categorization component returns the obtained content category to the content providing component in the content providing device.

In a detailed implementation, for example, a video with a duration of 26 minutes and 26 seconds needs to be categorized by the content providing device. Thus the data size, data type of the video are transmitted to the digest operation determination component of the operator. The digest operation determination component compares the data size with the threshold corresponding to the date type (video). Since the data size is larger than the predefined threshold for video data, the digest operation determination component informs the content providing device to transmit the content and address of the content to the digest obtaining component. The content providing device transmits the content to the digest obtaining component which is provided by the operator and locates in the same data center. The digest obtaining component selects an algorithm suitable for video to generate a digest with a duration of 6 minutes and 48 seconds (with a compression ratio of 3.89:1). The digest obtaining component transmits the digest and the address of the content providing device to the content categorization component for processing (the type information of the content submitted by an optional transmission is digest). The content categorization component performs categorization and then returns the content category to the content providing device.

In a practical deployment, the components generally belong to two sides, the former of which is the content provider providing the content and the latter is the operator or screening service provider. The operator provides the network access services such as Internet access, communication network access while operates their own content screening service. Furthermore, a content screening service can be provided to an operator by a separate screening service provider. To ensure the reliability of the digest, the digest obtaining component may locate only at the operator or the screening service provider.

The possible application modes are as follow. i) The content providing device belongs to the content provider while the rest of the components belong to the operator or the screening service provider. A digest server can be composed of a digest operation determination component and a digest obtaining component. The digest server can be located closely to the content provider so that broad bandwidth is possible. A digest server can be composed of a digest obtaining component. The digest server can be located closely to the content provider so that broad bandwidth is possible. ii) Both the content providing device and the digest operation determination component belong to the content provider and the rest of the components belong to the operator or the screening service provider. The digest obtaining component locates closely to the content providing device so that broad bandwidth is possible. The digest operation determination component of the content provider stores the threshold agreed by the operator/screening service provider through negotiation (the operator/screening service provider may provide script file defining the threshold, which will be read and executed by the digest operation determination component). If there is a one to one correspondence between the content providing device and the digest server (the digest operation determination component and the digest obtaining component)/digest obtaining component and the content categorization component stores the address of the content providing device corresponding to the digest server/digest obtaining component, then it is unnecessary to carry the address of the content providing device. Otherwise, the address of the content providing device has to be carried in the message.

In summary, according to the embodiments of the invention, the content categorization requester generates the content digest of the content to be categorized when it determines that the data size of the content to be categorized is larger than the threshold (it can also be determined according to whether the data format of the content to be categorized is one of the predefined data formats, and/or whether it is specified by a user) and requests to the content categorization provider for the content category by means of the generated content digest. Therefore, the embodiments of the invention extend the input parameters that are provided to the content categorization component and directly reflect the content. By significantly reducing the content data of the categorization operation, an efficient processing method is provided for the situation of large content, which not only reduces the processing burden of the content categorization component but also effectively reduces the network transmission traffic. Such improvements are especially beneficial for the scenario of external entities requesting category information.

Furthermore, before comparing the data size of the content to be categorized with the threshold, firstly determine whether to obtain the content category by means of the content itself. Thus, it is compatible with solutions that use the other existing input parameters (such as URI) to obtain the content category, which renders a better effect.

Furthermore, the type information may be used to inform the content categorization provider that what the content categorization request message carries is an content digest or the content itself. As a result, the content categorization provider may perform categorization processing by means of the most suitable method, which renders a better effect.

Furthermore, it is very beneficial for services, such as media stream, that may not be categorized in real time and media difficult to categorized in real time, such as video, multimedia, audio, picture, and large documents.

Obviously, those skilled in the art may devise various modifications and variations on the invention without departing from the spirit and scope of the invention. Thus, if the modifications and variations are in the scope of the claims of the invention and the equivalent technologies, the invention intends to include the modifications and variations.

What is claimed is:

1. A method for content categorization, comprising:

transmitting, by a content categorization requester, a content digest of a content to be categorized to a content categorization provider; and identifying type information of the content digest in a content categorization request, wherein the type information of the content digest identified in the content categorization request allows the content categorization provider to perform content categorization on the content digest by an algorithm of the type of the content digest.

2. The method for content categorization of claim 1, further comprising: obtaining, by the content categorization requester, the content digest when it determines necessary to obtain the content digest of the content to be categorized.

3. The method for content categorization of claim 2, wherein obtaining, by the content categorization requester, the content digest when it determines necessary to obtain the content digest of the content to be categorized, comprises:

obtaining, by the content categorization requester, the content digest of the content to be categorized when it determines at least one of: that data size of the content to be categorized is larger than a threshold; that the data format of the content to be categorized is one of predefined data formats; and that it is specified by a user.

4. The method for content categorization of claim 1, wherein the method further comprises:

performing, by the content categorization provider, content categorization on the content digest carried in the content categorization request by means of an algorithm according to the type information carried in the content categorization request.

5. A method for categorizing a content, comprising:

receiving, by a content categorization provider, a content categorization request which carries a content digest of a content to be categorized and type information of the content digest; and performing, by the content categorization provider, content categorization on the content to be categorized according to the content digest by an algorithm of the type of the content digest.

6. A content categorization requesting device, comprises:

a digest obtaining component, adapted to obtain content digest of content to be categorized;

a first transmit component, adapted to transmit the content digest obtained by the digest obtaining component to a content categorization provider;

a identifying component, adapted to identifying type information of the content digest in a content categorization request, wherein the type information of the content digest identified in the content categorization request allows the content categorization provider to perform content categorization on the content digest by an algorithm of the type of the content digest.

7. The method for content categorization of claim 6, further comprising: obtaining, by the digest obtaining component, the content digest when it determines necessary to obtain the content digest of the content to be categorized.

8. The method for content categorization of claim 7, wherein obtaining, by the by the digest obtaining component, the content digest when it determines necessary to obtain the content digest of the content to be categorized, comprises:

obtaining, by the content categorization requester, the content digest of the content to be categorized when it determines at least one of: that data size of the content to be categorized is larger than a threshold; that the data format of the content to be categorized is one of predefined data formats; and that it is specified by a user.

* * * * *